Aug. 4, 1936.  P. HOFFMAN  2,049,774

SEALING DEVICE

Filed Dec. 12, 1934

INVENTOR.
Paul Hoffman
BY
HIS ATTORNEY.

Patented Aug. 4, 1936

2,049,774

UNITED STATES PATENT OFFICE 2,049,774

SEALING DEVICE

Paul Hoffman, Easton, Pa., assignor to Ingersoll-Rand Company, Jersey City, N. J., a corporation of New Jersey Application December 12, 1934, Serial No. 757,094

2 Claims. (Cl. 286—9)

This invention relates to sealing devices, and more particularly to a sealing device adapted to prevent leakage along the shaft of centrifugal compressors and like machines.

One object of the invention is to maintain an effective seal both while the machine is in operation and when idle.

Another object is to protect the sealing device against the wearing action of a shaft operating at high speeds.

Still another object is to minimize the cost of maintaining an adequate seal in machines of this character.

Other objects will be in part obvious and in part pointed out hereinafter.

Figure 1:
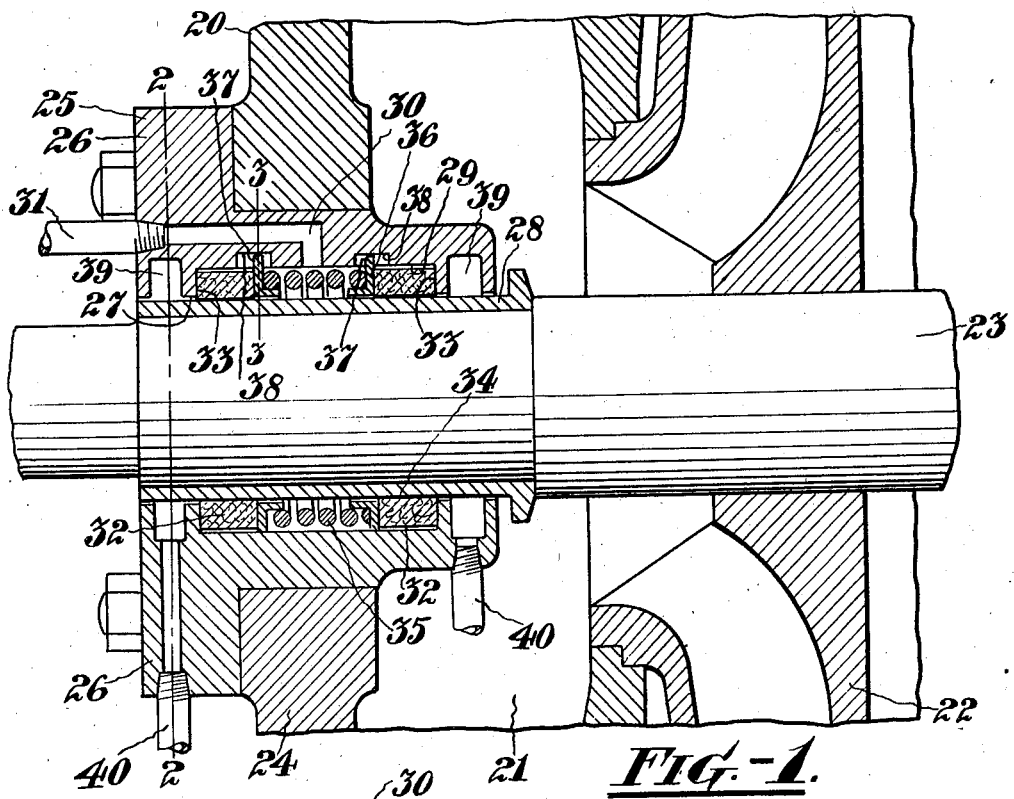
Figure 2:
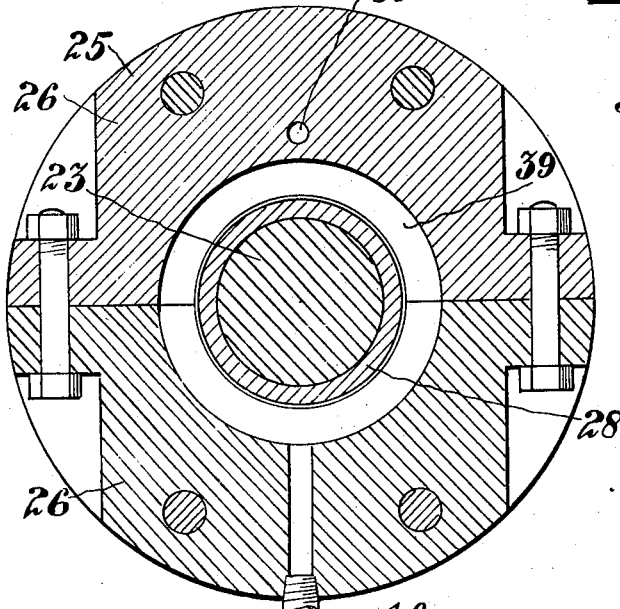
Figure 3:
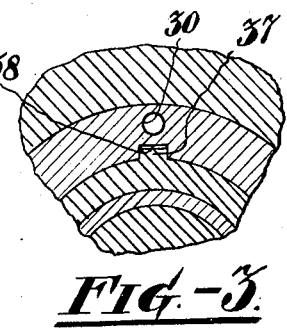

In the drawing accompanying this specification and in which similar reference numerals refer to similar parts, throughout the several views, Figure 1 is a longitudinal sectional elevation of a sealing device constructed in accordance with the practice of the invention and a portion of a centrifugal compressor to which it is applied, and Figures 2 and 3 are transverse views taken through Figure 1 on the lines 2—2 and 3—3, respectively.

Referring more particularly to the drawing, 20 designates, in general, a centrifugal vapor compressor of which the inlet opening 21 may be assumed to be connected to the evaporator (not shown) of an air conditioning system or like apparatus and during the operation of which the inlet opening 21 is subjected to a vacuum induced by the impeller 22 of the compressor and such other evacuating devices as may be incorporated in the system.

The impeller 22 is mounted upon a shaft 23 extending through the outer wall 24 of the compressor and which may be supported by suitable bearings (not shown).

In accordance with the practice of the invention, means are provided for maintaining a seal about the portion of the shaft lying in the plane of the wall 24 and thus adjacent the inlet opening 21 of the compressor. The form of the invention illustrated comprises a casing designated 25 and consisting of a pair of half sections or shells 26 of which the inner surfaces are recessed to define a bore 27 to receive the shaft.

The bore 27 is of sufficiently larger diameter than the shaft, or as shown a sleeve 28 arranged on that portion of the shaft, to prevent contact of the shaft with the wall of the bore 27 upon the occurrence of radial vibratory movement of the shaft incident to its operation at high speed.

Intermediate the ends of the bore 27 is an annular recess 29 into the mid portion of which sealing fluid, for example water, is introduced by a passage 30 connected to a conduit 31 leading from a suitable source of supply under superatmospheric pressure.

The ends of the recess 29 contain sealing rings 32 of non-metallic, non-abrasive material, as for example "bakelite". The rings seat against end surfaces 33 of the recess 29 and are of smaller diameter than the recess to prevent contact of their peripheral surfaces with the wall of the recess. The bores 34 of the rings 32 are only slightly larger than the diameter of the sleeve 28 to provide small clearances between these elements through which sealing liquid may flow in opposite directions from the recess 29.

In order to assure the retention of the rings 32 in sealing relationship with the surfaces 33 a coil spring 35 is interposed between the confronting ends of the rings 32. Preferably, annular spring seats 36 are provided for the ends of the spring to prevent direct contact between it and the rings, and the spring seats 36 are provided with key portions 37 which extend into slots 38 in the casing section 26 to prevent rotary movement of these elements with the shaft.

In the portions of the casing intermediate its extremities and the ends of the recess are annular cavities 39 to intercept such portions of the sealing liquid as may pass from the ends of the recess, and each cavity is provided with a conduit 40 for conveying such liquid from the cavities. In such instances as where the sealing device is being used for sealing a chamber under vacuum the innermost conduit 40 preferably leads to a region or vessel subjected to substantially the same pressure as the inlet chamber 21.

In practice, sealing liquid under pressure is introduced into the recess 29 between the rings 32 and a small portion of the liquid flows in opposite directions from the recess, through the rings 32, into the cavities 39, whence it flows to suitable destinations through the conduits 40. The outermost ends of the rings are held in sealing relationship with the adjacent surfaces 33 of the casing by the pressures of the liquid and the spring 35 acting against the confronting ends of the rings. Thus, the liquid will serve both to maintain an adequate seal between the rings and the shaft 23 and also to lubricate the adjacent surfaces of these elements, thereby preventing wear and a consequent increase in the consumption of sealing liquid.

As will be readily apparent to those skilled in the art, the sealing device permits of a large degree of clearance between the shaft and the casing and these parts, as well as the elements relied upon for effecting a seal, will therefore be protected against injury such as might result through the occurrence of radial vibration of the shaft.

A further advantage of the present invention is that, constructed and arranged in the manner described, it serves not only to maintain a good seal about the shaft during the operation of the machine but also when the machine is idle and thus, in a compressor of the type illustrated, to prevent the breaking of the vacuum after a period of operation.

I claim:

1. A sealing device for centrifugal compressors and the like, comprising a casing having a bore and a recess, a rotary member extending through the bore but not engaging its wall, sealing rings in the recess encircling the rotary member and having bores of larger diameter than the diameter of the rotary member to provide clearances between the rotary member and the sealing rings for the passage of sealing liquid along the rotary member, annular spring seats seating against the confronting ends of the sealing rings and being keyed to the casing, a spring acting against the spring seats to press the sealing rings into sealing engagement with the end walls of the recess, and means for conveying sealing liquid to the recess and the clearances between the sealing rings and the rotary member.

2. A sealing device for centrifugal compressors and the like, comprising a casing having a bore and a recess, a rotary member extending through the bore but not engaging its wall, phenol formaldehyde condensation product sealing rings in the recess encircling the rotary member and having bores of larger diameter than the diameter of the rotary member to provide clearances between the rotary member and the wall of the recess for the passage of sealing liquid along the rotary member, annular spring seats seating against the confronting ends of the sealing rings and being keyed to the casing, a spring acting against the spring seats to press the sealing rings into sealing engagement with the end walls of the recess, and means for conveying sealing liquid to the recess and the clearances between the sealing rings and the rotary member, said casing having drain cavities between its extremities and the recess to intercept liquid issuing from the ends of the recess.

PAUL HOFFMAN.